(12) United States Patent
Lu

(10) Patent No.: US 6,494,583 B2
(45) Date of Patent: Dec. 17, 2002

(54) MIRROR ADJUSTMENT MECHANISM FOR LIQUID CRYSTAL PROJECTOR

(75) Inventor: Chang-Hsing Lu, Taoyuan Shien (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 09/855,097

(22) Filed: May 14, 2001

(65) Prior Publication Data
US 2002/0030903 A1 Mar. 14, 2002

(30) Foreign Application Priority Data
Sep. 13, 2000 (TW) .................................... 89215825 U

(51) Int. Cl.[7] ................................................ G03B 21/28
(52) U.S. Cl. .......................................... 353/98; 353/69
(58) Field of Search ................................. 359/879, 871, 359/872, 873, 874, 896; 353/31, 34, 37, 98, 99, 69

(56) References Cited

U.S. PATENT DOCUMENTS 6,059,412 A * 6/2000 Sugita .......................... 353/37

* cited by examiner

Primary Examiner—Hung Xuan Dang
Assistant Examiner—Tuyen Tra
(74) Attorney, Agent, or Firm—Alston & Bird LLP

(57) ABSTRACT

An adjustment mechanism for a mirror of a projector is provided. The adjustment mechanism includes a supporting portion for supporting the mirror and an adjusting device. The supporting portion includes a first plate having a surface in contact with the mirror, a second plate connected with the top edge of the first plate and a resilience sheet disposed between the first plate and a housing of the projector, wherein the adjusting device passes through a hole of the second plate to be in contact with the housing and capable of being adjusted for rotating the mirror.

12 Claims, 6 Drawing Sheets

MIRROR ADJUSTMENT MECHANISM FOR LIQUID CRYSTAL PROJECTOR

FIELD OF THE INVENTION

The present invention relates to an adjustment mechanism for a mirror, and more particularly to an adjustment mechanism for a mirror of a liquid crystal projector.

BACKGROUND OF THE INVENTION

FIG. 1 illustrates a structure of a liquid crystal projector according to prior art. The liquid crystal projector includes a light source 1, a light integrator 3, a condenser lens 4, a first dichroic mirror 5, a second dichroic mirror 6, a first liquid-crystal panel 7, a second liquid-crystal panel 8, a third liquid-crystal panel 9, a tri-color synthetic prism 10, a projection lens 11, a total reflection mirror 12, a field lens 15, a first reflection mirror 17, a second reflection mirror 18, a third reflection mirror 14 and a relay lens 21.

The light source 1 emits polychromatic light. The light integrator 3 is used for making the amount of light in the beam from the light source 1 substantially uniform in a cross section normal to the optical axis. The condenser lens 4 is used for gathering rays emitted from the light integrator 3. The first dichroic mirror 5 and the second dichroic mirror 6 are used for separating the polychromatic light into three chromatic components, i.e. a blue component, a red component and a red component. Each of the first liquid-crystal panel 7, the second liquid-crystal panel 8 and the third liquid-crystal panel 9 is used for modulating each chromatic component in response to predetermined data. The projection lens 11 is used for forming images of the rays composed at the tricolor synthetic prism 10 onto a screen (not shown). The total reflection mirror 12 is arranged on the condenser lens 4 for reflecting rays emitted from the light integrator 3, thereby directing them to the condenser lens 4.

The first dichroic mirror 5 separates the incident rays into a blue component and a remainder component composed of a green component and a red component. The second dichroic mirror 6 separates the remainder component into a green component and a red component. The red component passes through the relay lens 21 arranged between the first reflection mirror 17 and second reflection mirror 18 and is then projected onto the third liquid-crystal panel 9. The blue component is totally reflected by the third reflection mirror 14 and modulated into a parallel ray by the field lens 15 to project onto on the first liquid-crystal panel 7. The green component passes through the field lens 16 located along the optical path thereof so as to form a parallel ray and project onto the second liquid-crystal panel 8.

In the optical devices described above, only the red component has a different distance from the source 1 to the tricolor synthetic prism 10. Thus, a relay lens 21 is arranged between the first reflection mirror 17 and the second reflection mirror 18 so as to make the source 1 of the red component have equal distance as that of the blue and the green component.

However, the structure of the customarily used liquid crystal projector in FIG. 1 has the advantages of image deviations in positioning due to the tolerance of assembly or production. Referring to FIGS. 2(a) and 2(b), a tilt adjustment mechanism is built in the total reflection mirror 12 for adjusting the orientation thereof. The tilt adjustment mechanism includes a mirror supporting frame 23 for supporting a bottom edge of the mirror 12, a bottom supporting member 24 for supporting one surface of the mirror 12 near its bottom edge at the center thereof, a pair of top supporting member 25 for supporting the top edge of the mirror 12 and two springs 26 and 27 for pushing against the opposite surface of the mirror 12, thereby holding the mirror securely against the supporting members 24 and 25. The top supporting member 25 includes an adjusting plate 28, a fixing member 29 (e.g. a screw) for fixing the adjusting plate 28 to the supporting frame 23. The tilt adjustment mechanism is implemented by loosing the screw, shifting each adjusting plate 28 forward or backward relative to the mirror 12 and fixing the adjusting plate 28 to the supporting frame 23. Because the above-mentioned tilt adjustment mechanism is performed by rotating the mirror 12 via the bottom supporting member 24 as a pivot, the top edge of the mirror is always shifted more than the bottom edge. Therefore, the image deviations still could not be effectively reduced. Therefore, the present invention provides an improved mirror adjustment device for overcoming the problems described above.

SUMMARY OF THE INVENTION

It is an object of the present invention to provide an adjustment mechanism of a mirror for a liquid crystal projector for reducing image deviations due to the tolerance of assembly or production.

It is another object of the present invention to provide an adjustment mechanism of a mirror for a liquid crystal projector by rotating the mirror via a tip of a resilience sheet as a pivot.

In accordance with one aspect of the present invention, there is provided an adjustment mechanism including a supporting portion and an adjusting device. The supporting portion includes a first plate having a surface in contact with the mirror, a second plate connected with the top edge of the first plate and a resilience sheet disposed between the first plate and a housing of the projector. The adjusting device passes through a hole of the second plate to be in contact with the housing and is capable of being adjusted for rotating the mirror.

Preferably, the projector is a liquid crystal projector.

Preferably, the mirror is one of a reflection mirror and a total reflection mirror.

Preferably, the second plate is L-shaped.

Preferably, the resilience sheet has two ends connected with the housing and a tip in contact of the center of the first plate.

Preferably, the resilience sheet is in a shape of an arc, wherein the tip of the arc is in contact with the center of the first plate.

Preferably, the adjusting device is a screw.

In accordance with another aspect of the present invention, there is provided an adjustment mechanism for adjusting a mirror of a liquid crystal projector. The adjustment mechanism includes a first plate having a surface in contact with the mirror, a second plate connected with the top edge of the first plate, a resilience sheet disposed between the first plate and a housing of the projector and has two ends connected with the housing and a tip in contact of the center of the first plate, and a screw passing through a hole of the second plate to be in contact with the housing and capable of be adjusted for rotating the mirror via the tip as a pivot.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Figure 1:
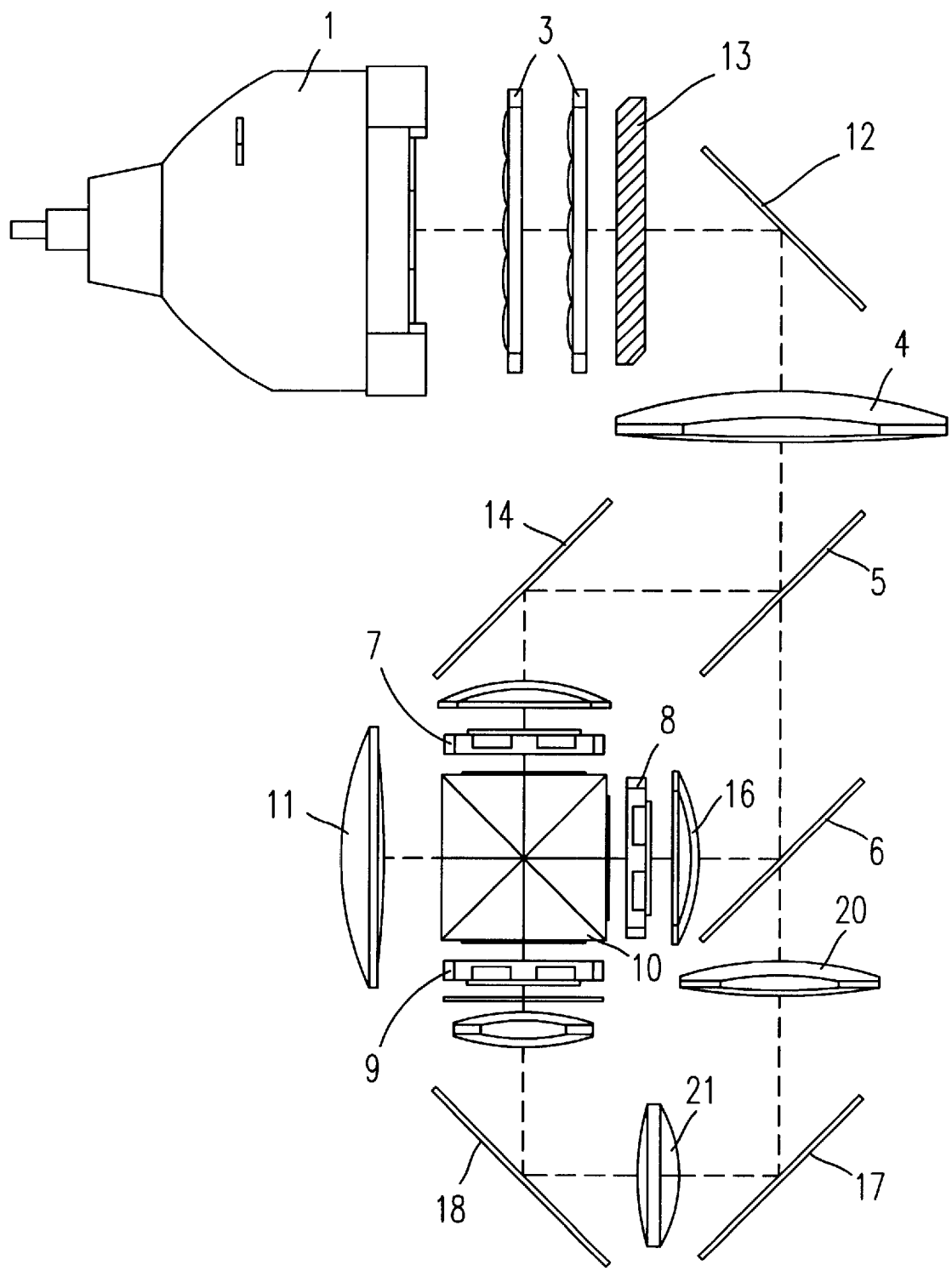
FIG. 1 is a view showing the structure of a liquid crystal projector according to the prior art.
Figure 2A:
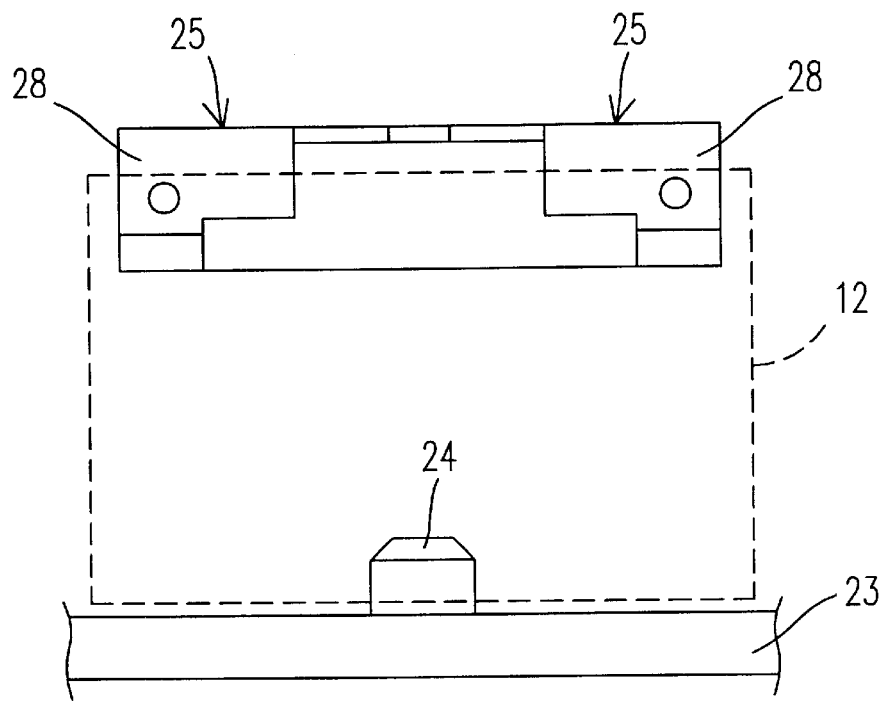
FIG. 2(a) is front view showing a tilt adjustment mechanism used in a reflection mirror of a liquid crystal projector according to the prior art.
Figure 2B:
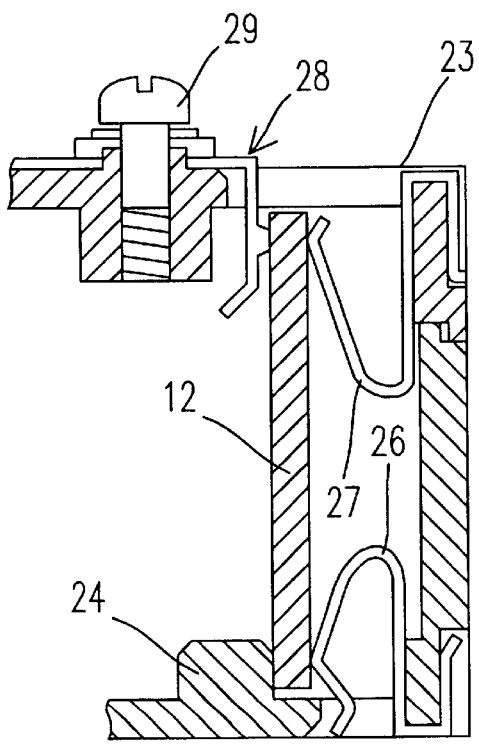
FIG. 2(b) is a vertical cross-sectional view showing a tilt adjustment mechanism in FIG. 2(a)
Figure 3:
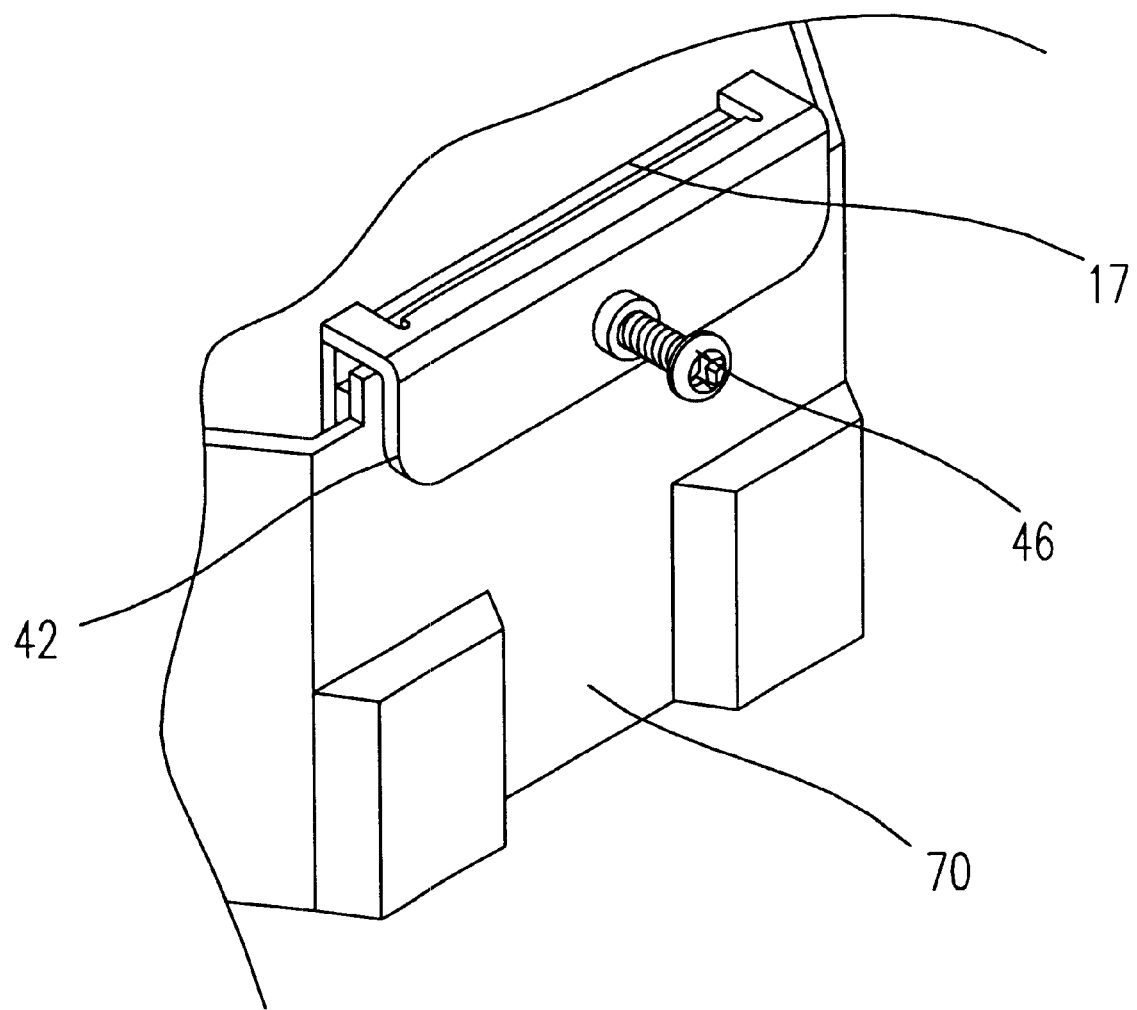
FIG. 3 is a perspective view illustrating an adjustment mechanism used in the first reflection mirror according to a preferred embodiment of the present invention.
Figure 4:
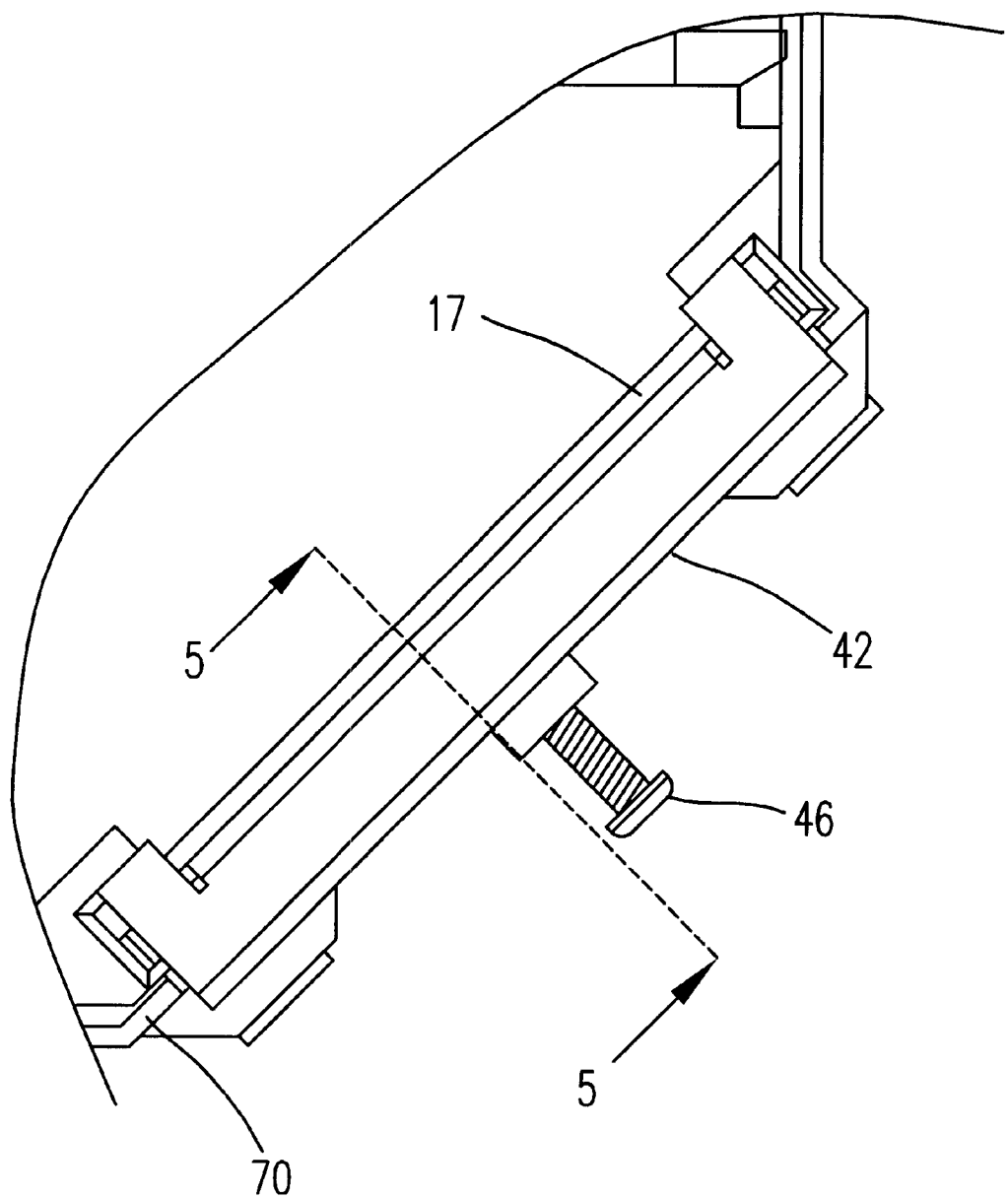
FIG. 4 is a partial top view illustrating an adjustment mechanism in FIG. 3.
Figure 5:
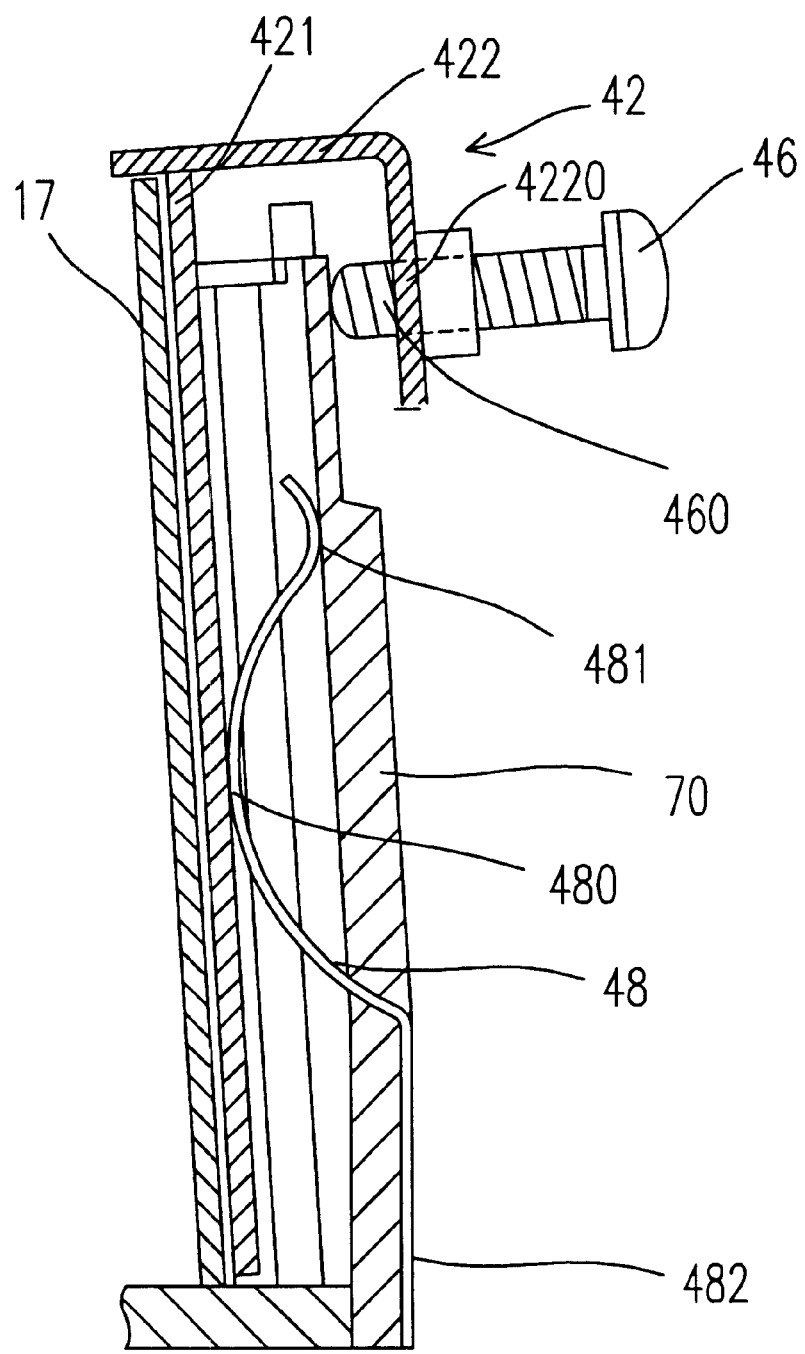
FIG. 5 is a partial cross-sectional view illustrating an adjustment mechanism taken along the line 5—5 in FIG. 4, wherein the screw is adjusted to press the housing of the projector.

Please refer to FIGS. 3, 4 and 5. The adjustment mechanism according to the preferred embodiment of the present invention is constructed on the first reflection mirror 17. The adjustment mechanism includes a supporting portion for supporting the mirror and an adjusting portion for rotating the mirror. The supporting portion includes a first plate 421, a second plate 422 and a resilience sheet 48. One surface of the first plate 421 is in contact with the back surface of the first reflection mirror 17. The L-shaped second plate 422 is connected with the top edge of the first plate 421. The resilience sheet 48 is disposed between the first plate 421 and the housing 70 of the projector and preferably in a shape of arc. The two ends of the resilience sheet 48 are connected with the housing 70 and the tip 480 thereof is in contact of the center of the first plate 421 for pushing against the opposite surface of the first plate 421 at the center thereof. The adjusting portion mainly includes a screw 46 passing through a hole 4220 of the second plate 422, and the end 460 of the screw 46 is in contact with the housing 70 of the projector.

Figure 6:
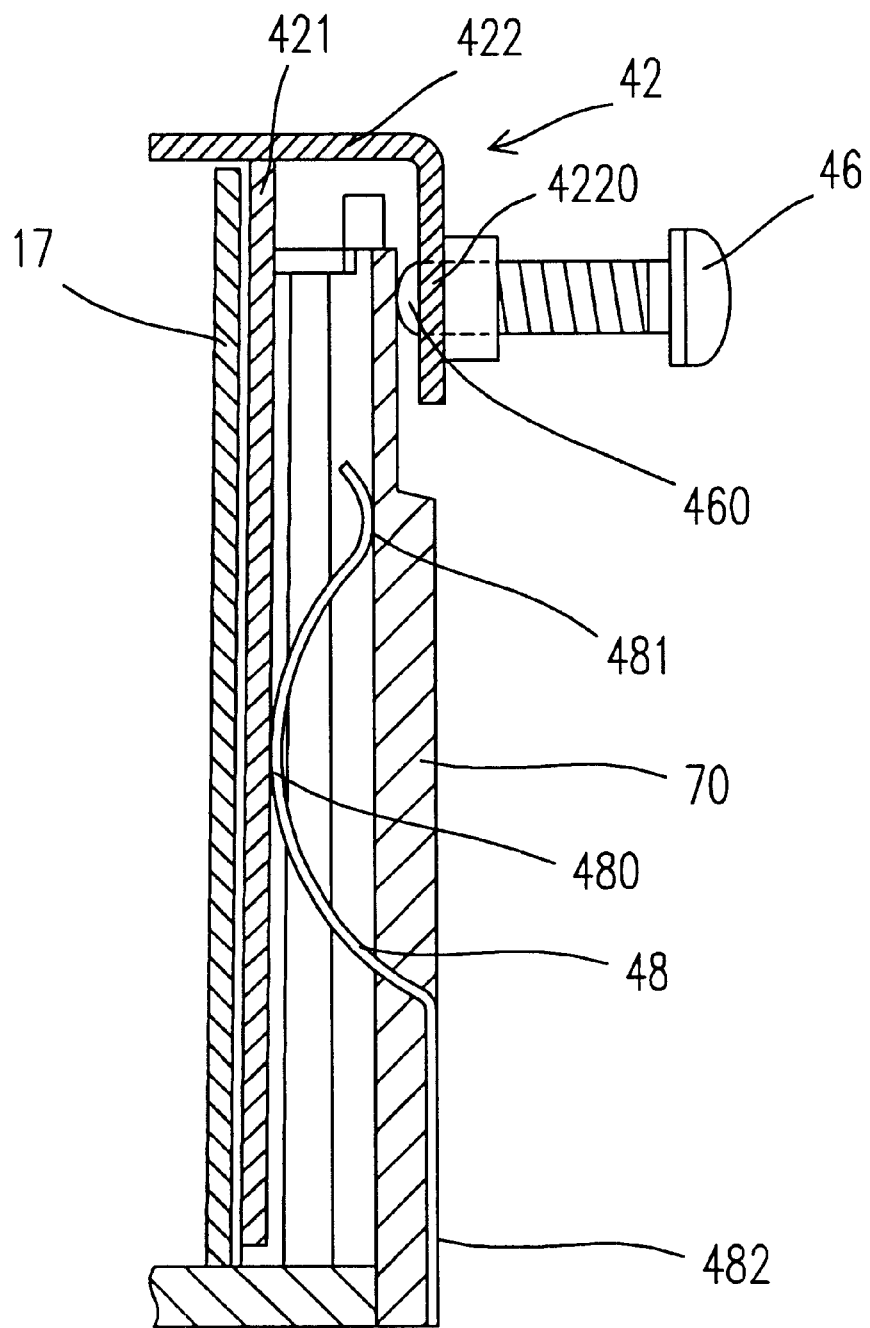
FIG. 6 is a partial cross-sectional view illustrating an adjustment mechanism taken along the line 5—5 in FIG. 4, wherein the screw is adjusted to be loosed from the housing of the projector.

When the screw 46 is adjusted to be tightly in contact with the housing 70, the top edge of first plate 421 is forced to move toward the direction distant from the housing 70, as can be seen in FIG. 5. As well, when the screw 46 is adjusted to be loosely in contact with the housing 70, the top edge of first plate 421 is forced to move toward the housing, as can be seen in FIG. 6.

Because the center of the first plate 421 is pushed against the resilience sheet 48 at the tip 480 thereof, the mirror 17 is rotated via the tip 480 as a pivot. The image deviation of the light passing through the center of the mirror 17 could be effectively reduced in accordance with the present invention.

Certainly, the adjustment mechanism can also be suitable for the second reflection mirror 18, the third reflection mirror 14 and the total reflection mirror 12.

It will be understood that the mirror is rotated via the tip of the resilience sheet or the center of the first plate so as to reduce the image deviation in the center of the mirror.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. An adjustment mechanism for a mirror of a projector, comprising:

a supporting portion for supporting said mirror and comprising a first plate having a surface in contact with said mirror, a second plate connected with the top edge of said first plate and a resilience sheet disposed between said first plate and a housing of said projector, wherein said resilience sheet has two ends connected with said housing and a tip thereof in contact of the center of said first plate; and an adjusting device passing through a hole of said second plate to be in contact with said housing and capable of being adjusted for rotating said mirror.

2. The adjustment mechanism according to claim 1, wherein said projector is a liquid crystal projector.

3. The adjustment mechanism according to claim 1, wherein said mirror is one of a reflection mirror and a total reflection mirror.

4. The adjustment mechanism according to claim 1, wherein said second plate is L-shaped.

5. The adjustment mechanism according to claim 1, wherein said resilience sheet is in a shape of an arc.

6. The adjustment mechanism according to claim 5, wherein the tip of said arc is in contact with the center of said first plate.

7. The adjustment mechanism according to claim 1, wherein said adjusting device is a screw.

8. An adjustment mechanism for adjusting a mirror of a liquid crystal projector, comprising:

a first plate having a surface in contact with said mirror;

a second plate connected with the top edge of said first plate;

a resilience sheet disposed between said first plate and a housing of said projector and having two ends connected with said housing and a tip in contact of the center of said first plate; and a screw passing through a hole of said second plate to be in contact with said housing and capable of be adjusted for rotating said mirror via said tip as a pivot.

9. The adjustment mechanism according to claim 8, wherein said mirror is one of a reflection mirror and a total reflection mirror.

10. The adjustment mechanism according to claim 8, wherein said second plate is L-shaped.

11. The adjustment mechanism according to claim 8, wherein said resilience sheet is in a shape of an arc.

12. The adjustment mechanism according to claim 11, wherein the top end of said arc is in contact with the center of said first plate.

* * * * *